Figure 1:
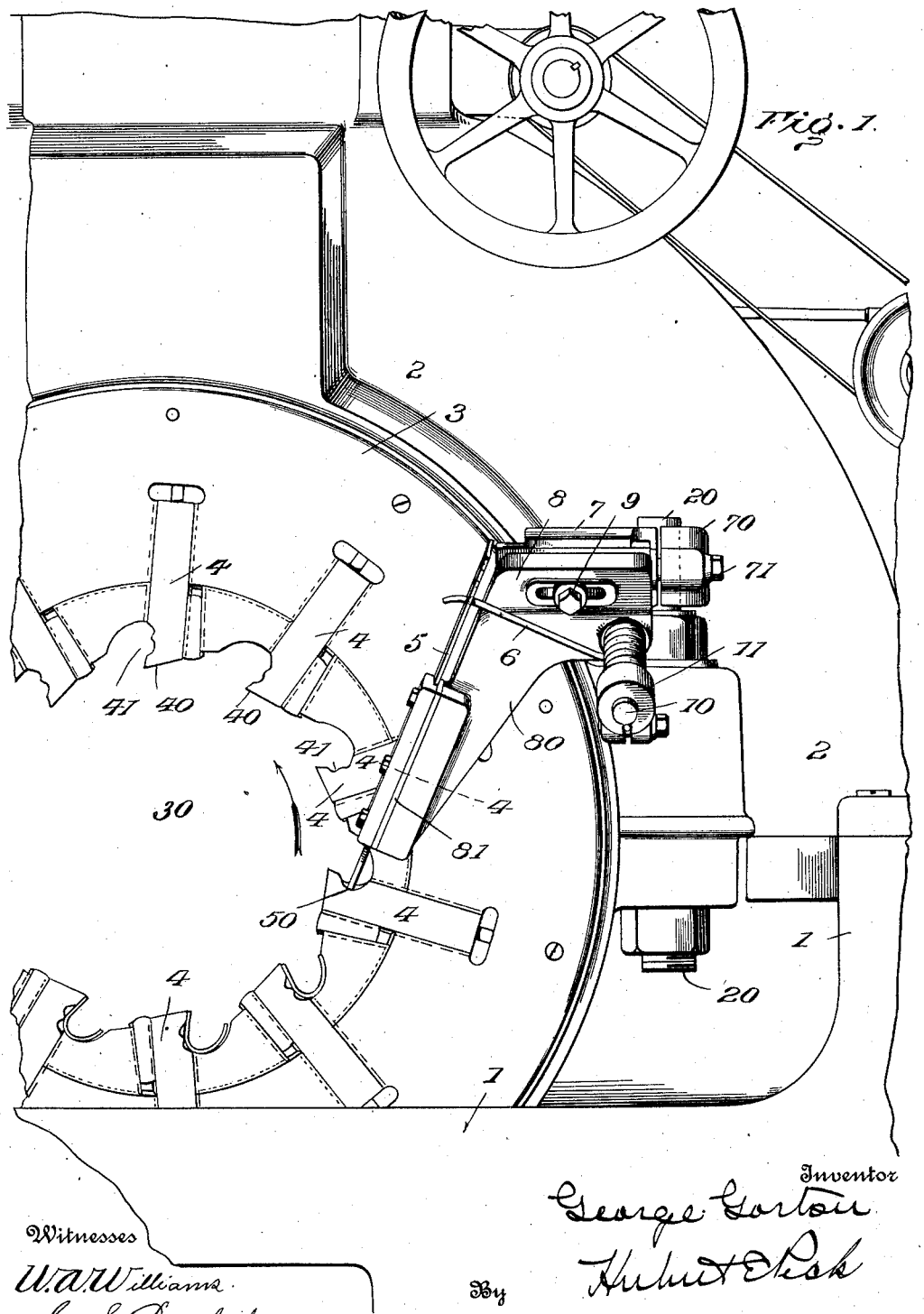

G. GORTON.
METAL CUTTING-OFF DEVICE.
APPLICATION FILED JULY 18, 1910.

1,043,093.

Patented Nov. 5, 1912.
3 SHEETS—SHEET 1.

Witnesses
W. A. Williams
S. S. Burket

Inventor
George Gorton
By Hubert E. Fisk
Attorney

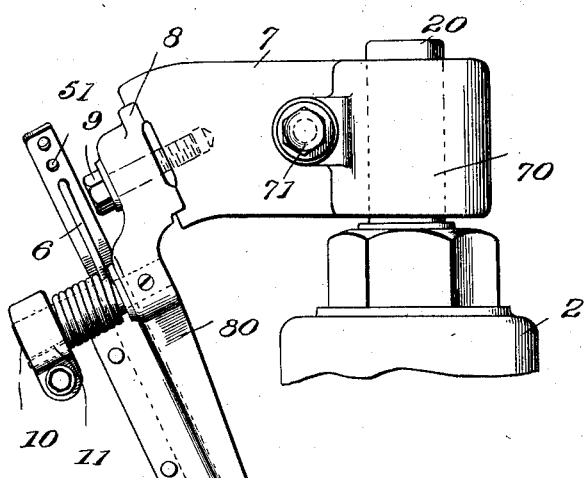
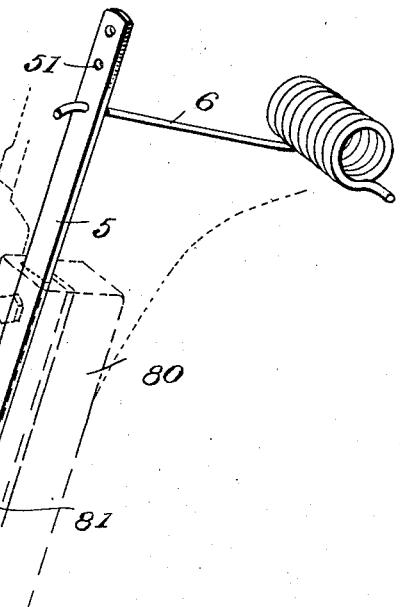
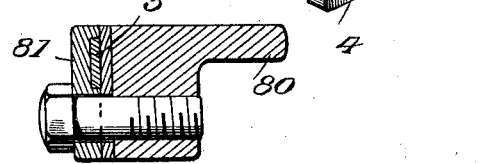

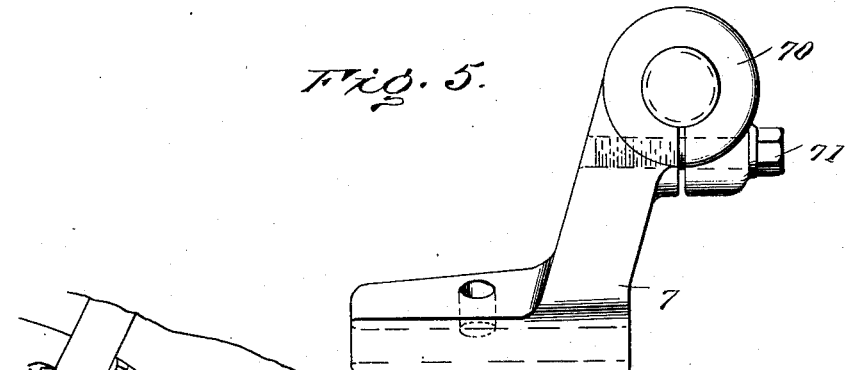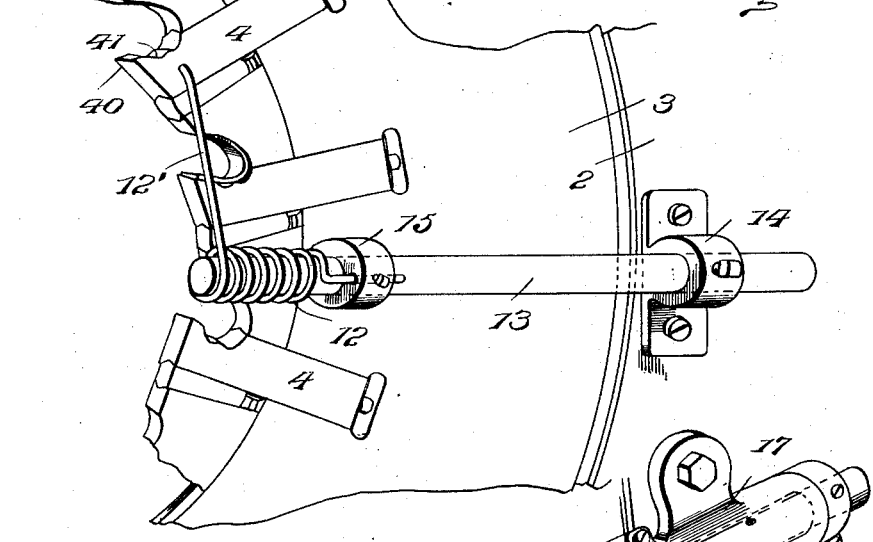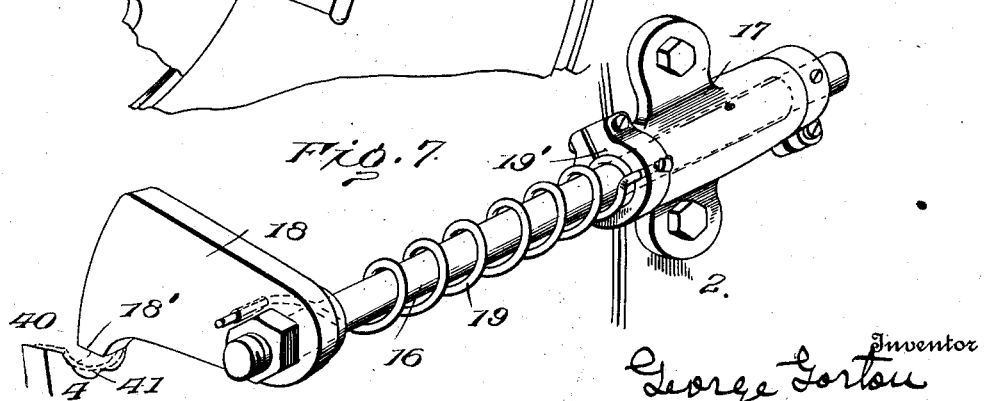

UNITED STATES PATENT OFFICE.

GEORGE GORTON, OF RACINE, WISCONSIN.

METAL-CUTTING-OFF DEVICE.

1,043,093.　　　　Specification of Letters Patent.　　　Patented Nov. 5, 1912.

Application filed July 18, 1910.　Serial No. 572,607.

*To all whom it may concern:*

Be it known that I, GEORGE GORTON, a citizen of the United States, residing at Racine, Racine county, Wisconsin, have invented certain new and useful Improvements in Metal-Cutting-Off Devices; and I do hereby declare the following to be a full, clear, and exact description of the invention, such as will enable others skilled in the art to which it appertains to make and use the same.

This invention relates to certain improvements in or relating to rotary metal cutting off mechanism or the like, and more particularly relates to devices for removing or displacing metal chips from metal cutters; and the objects and nature of the invention will be readily understood by those skilled in the art in the light of the following description of the accompanying drawings illustrating what I now consider the preferred embodiments from among other formations, and arrangements within the spirit and scope of my invention.

An object of the invention is to provide means for knocking off the chips that adhere to the throats or front edges of the cutters carried by the rotary blades of metal cutting-off machines, particularly machines of the high speed "Gorton" or internal saw type, and thereby prevent said chips passing into the work with the cutters and greatly increasing the percentage of broken cutters.

A further object of the invention is to provide a metal cutting off machine with means actuated by the rotation of the cutter blade, for successively and angularly hammering or striking the chip receiving portions of the cutters, as the cutters pass from the work, to dislodge and remove the chips from such cutters and thereby clean the cutters before they again pass to the work.

A further object of the invention is to provide an efficient, durable and comparatively simple chip breaker or remover for the cutters of cutting off machines, saws or the like.

The invention consists in certain novel features in construction or in combinations or arrangements as more fully and particularly set forth hereinafter.

Referring to the accompanying drawings:—Figure 1, is an elevation showing a portion of a cutting off machine of the "Gorton" type with a chip breaker or remover of my invention, applied thereto. Fig. 2, is a rear elevation of the chip remover, a portion of the cutting off machine feed carriage and of the rotary cutter blade being shown. Fig. 3, is a detail perspective view showing portions of the chip remover, and a cutter engaged by the hammer or striker of the remover. Fig. 4, is a cross section on the line 4—4, Fig. 1. Fig. 5, is a detail top plan view of a portion of the supporting bracket of the chip remover. Fig. 6, is a perspective showing a modified chip remover, and a portion of a rotary cutter blade and its cutters which said remover is arranged to successively hammer. Fig. 7, is a detail perspective of another form of chip remover.

In the practical operation of rotary metal cutting off machines, particularly those of the "Gorton" high speed internal saw type, it has been found that the chips of metal removed from the work often adhere to the throats or front edges of the cutters and again pass into the work with such cutters particularly when soft stock such as soft steel or the like, is being operated on and that the danger of cutter breakage is materially increased by the presence of such chips. These chips stick to the points of the cutters and are carried thereby into the cut in the work and frequently break the cutters, and cause considerable damage, expense and delay. This invention provides means for cleaning or freeing the cutters of adhering chips before they again enter the work to cut off another chip therefrom, and although I show several forms of devices for this purpose, yet wish it understood that I do not limit my invention to the specific constructions illustrated, except as required by the scope of the appended claims, inasmuch as various formations can be devised for this purpose all utilizing the generic features of my invention.

In the drawings, I disclose such portions of a "Gorton" high speed cutting off machine as necessary to show the application of the present invention, and in this connection 1, is a portion of the stationary or fixed base of such machine; 2, a portion of the reciprocatory or other feed carriage in which is mounted the rotary hollow cutter blade-carrying-and-driving drum and its actuating gearing. 3, is the cutter blade fixed to and driven by said drum and having a central work receiving opening 30, with cutters 4, fixed to said blade and arranged around and projecting into said opening. Each cutter has a working point 40, and a front chip receiving portion or throat 41.

20, is an upwardly projecting vertical bolt arranged at the front face of the feed carriage and fixed thereto and arranged adjacent to the cutter blade rotating in said carriage, and in the type of chip remover shown by Fig. 1, this bolt is utilized as the support or point of attachment of the chip remover frame or support.

In the type of my invention illustrated by Fig. 1, an elongated hammer or striker is employed movable longitudinally to drive its end against each cutter and thereby impart an endwise blow thereto at the chip receiving portion thereof, and this endwise movable hammer is arranged at an angle or inclination to the plane of the cutter blade to impart an angularly directed blow against each cutter for the purpose of more readily dislodging the chip and knocking the same laterally from the cutter. The hammer 5, in this specific example, is formed by an elongated straight flat comparatively thin narrow strip of spring steel arranged in front of the cutter blade and to one side of the work opening 30, thereof, with its upper end spaced outwardly a distance from the upper right hand portion of the blade and with its lower striking or hammer end 50, extending into the circle in which the inner projecting ends of the cutters move. It will hence be noted that the hammer is inclined downwardly and inwardly toward the blade and the longitudinal axis of the hammer intersects the plane of the cutter blade at an acute angle. A suitable spring, such as 6, constantly exerts its tension on the hammer to force the same down to its limit of downward or inward movement toward the cutters. The hammer is so arranged with respect to the movement of the cutters as to intersect the circle in which the throats or chip receiving portions of the cutters move, and to successively engage the cutters after they pass from the work or stock, for instance, as they move upwardly on their return stroke toward the work. As the cutter blade rotates, the hammer is forced longitudinally and upwardly, against the tension of its spring as the cutter engaged by said hammer moves upwardly, until the striking end of the hammer moves out from the plane of the cutter and cutter blade, and the hammer is then held up and back by the outer side face of the cutter and adjacent surfaces intervening between cutters, which slip past the hammer striking end. When said surfaces have slipped past the hammer end, said hammer is suddenly released and under the impulse of its spring moves inwardly and longitudinally and delivers a sharp blow against the front side edge of the throat of the next succeeding cutter or against a chip that might be caught in said throat. This blow is delivered at an angle or in a direction to break or dislodge the chip and drive the same laterally and rearwardly from the cutter. The striking end of the hammer is usually cut off square but by reason of the angular position of the hammer said striking end presents a beveled or angular edge to the cutter for the purposes of effectively dislodging the chip and readily slipping from cutter to cutter as the blade revolves. It will be readily understood that the hammer is lifted and suddenly released by each cutter as the blade revolves, so that the hammer slips and snaps from cutter to cutter to deliver its effective chip dislodging blow at the throat of each cutter.

Any suitable supporting and guiding means can be provided for the hammer and its actuating spring. For instance, in the type illustrated by Fig. 1, I show the hammer and its spring carried by a bracket comprising relatively adjustable members, the bracket being removably mounted on the bolt end 20, forming a part of the feed carriage. This bracket consists of a horizontally or laterally disposed supporting plate or arm 7, formed with a split hub 70, to receive the bolt end 20, and adapted to be rigidly clamped thereon by the bolt 71, and the other member of the bracket consists of an angle piece having a laterally or horizontally arranged top plate 8, and a depending inwardly inclined arm 80, provided with an inwardly and downwardly inclined elongated housing or guide way 81, in which the hammer 5, is confined to reciprocate. The lateral plate 8, is usually transversely inclined to conform to the front inclined face of the horizontally or laterally extending plate 7, and is fitted thereto to be adjustable longitudinally thereof to secure the desired adjustment of the striking end of the hammer radially with respect to the cutters. The members of the bracket are clamped together by the bolt 9, passing through a longitudinal slot in the plate 8, and screwing into the plate or arm 7, as will be well understood by those skilled in the art. Adjustment of the striking end of the hammer toward and from the plane of the cutter blade can be attained by moving the split hub 70, axially on the bolt 20. The front or angular member of the bracket is provided with an outwardly projecting stud or pin 10, receiving the coiled hammer actuating spring which terminates in the laterally extending downwardly springing end 6, loosely inserted in any one of a series of perforations 51, in the projecting upper end of the hammer 5. The opposite end of the coiled spring is secured to a split hub 11, on the pin 10, and provided with a clamping screw whereby the hub can be fixed on the pin at the desired position to secure the desired tension of the spring.

The bracket carrying the hammer and its actuating spring can be readily applied to and removed from the cutting off machine and is capable of various adjustments whereby the striking end of the hammer can be set in the desired relation with respect to the cutters.

While this form of endwise striking hammer and supporting bracket constitutes an exceedingly durable and efficient device, yet I do not wish to limit my invention to any particular form or arrangement of supporting bracket nor to this particular type of hammer. For instance, in Fig. 6 I show a form of hammer consisting of a strong stiff coiled spring 12, mounted on a stationary pin or stud 13, arranged about horizontally in front of the cutter blade and spaced therefrom and secured to a suitable portion of the feed carriage by a bracket 14. This spring is formed with the inwardly and downwardly springing free or striking end 12' extending inwardly and upwardly from the coil and bearing inwardly against the cutters and being successively lifted thereby and released to snap angularly against the throat portions of the succeeding cutters to dislodge the chips and knock them laterally therefrom, approximately according to the action of the hammer of Fig. 7. The tension of the spring 12, 12', can be varied by the adjustable collar 15, to which one end of the spring is secured. The collar being axially adjustable about the pin and provided with a set screw for locking the same on the pin.

If so desired, a type of hammer, such as disclosed by Fig. 7, can be employed. In this type, a rock shaft 16, is arranged about horizontally in front of the cutter blade and at its outer end is carried by and rocks in a box or bearing in a bracket 17, fixed to the front face of the feed carriage. A hammer 18, is fixed to the inner end of this shaft to rock therewith and extends radially usually upwardly, therefrom. This hammer for the sake of durability can consist of a flat spring steel plate, as shown by Fig. 7, having the striking portion or projection 18', at the inner corner of the free end thereof. The rock shaft is spring actuated to constantly and yieldingly hold the hammer to the cutters, by coiled spring 19, at one end fixed to the shaft and at the other end suitably fixed to a tension varying collar 19' held to the bearing bracket and against rotation. The hammer 18 will bear against the cutters and slip from cutter to cutter imparting the chip dislodging blows to the throat portions thereof as described in connection with the forms hereinbefore referred to.

It is evident that various changes, variations and modifications might be resorted to without departing from the spirit and scope of my invention as defined by the appended claims, and hence I do not wish to limit myself to the exact disclosures hereof.

What I claim is:—

1. A rotary cutter blade provided with projecting cutters, in combination with chip-breaking striking means, substantially as described.

2. A metal cutting off mechanism comprising a rotary holder provided with a series of spaced cutters having chip receiving portions, and chip removing means acting successively on said cutters after they have passed from the work to remove the chips therefrom and embodying an actuating device whereby a forceful chip dislodging stroke is delivered against chips on said chip receiving portions.

3. A rotary blade provided with metal cutters, in combination with a chip dislodging hammer coöperating with said cutters.

4. A metal cutting off saw, in combination with a spring actuated chip removing hammer.

5. A rotary blade provided with projecting metal cutters having chip receiving throats, in combination with a spring actuated chip dislodging hammer arranged to operatively engage the cutters successively as they pass from the work, said hammer arranged to snap from cutter to cutter in the circle of movement of the throats thereof.

6. A metal cutting off saw provided with cutters, in combination with a chip removing hammer having a striking portion extending into the circle of movement of the cutters and adapted to be successively lifted and released by the cutters, and actuating means and a support therefor arranged beside said saw.

7. A metal cutting off saw provided with projecting cutters, in combination with a chip removing hammer arranged to coöperate with said cutters successively as they pass from the work, and a spring for actuating said hammer on its cutter striking stroke, said hammer having a striking portion movable in an angular path with respect to the plane of movement of said cutters.

8. A cutting off saw having projecting cutters, in combination with a chip removing hammer having a striking portion angularly arranged with respect to the plane in which the cutters move and arranged to successively engage the chip receiving portions of the cutters as they move from the work.

9. A rotary cutter blade having a central work receiving opening and provided with cutters arranged around and projecting into said opening, in combination with a chip remover arranged to coöperate with the cutters successively as they pass from the work to dislodge the chips therefrom.

10. A rotary cutter blade having a central work receiving opening and provided with cutters arranged around and projecting into said opening, in combination with means for dislodging chips from said cutters comprising a support, a movable chip dislodging member projecting into the path of movement of said cutters, and means normally and yieldingly holding said member extending into said path in opposition to the rotation of the blade, substantially as described.

11. A rotary metal cutting off saw, in combination with a spring actuated chip remover arranged opposite a side face thereof and comprising a striking portion yieldingly held into the circle of movement of the cutters of said saw and in a direction opposite to the movement thereof and at an angle thereto to be successively lifted by said cutters and to snap from cutter to cutter.

12. A rotary saw having cutters, in combination with a chip remover comprising a hammer adapted to strike the chip receiving portions of the cutters and a coiled actuating spring therefor.

13. A chip remover comprising an endwise movable hammer having a striking end, and an actuating spring therefor in combination with a movable cutter blade having cutters coöperating with said hammer.

14. A chip remover comprising an edgewise movable plate having a striking edge, and an actuating spring for driving said plate on its striking stroke in combination with a rotary blade having cutters to successively engage said striking edge.

15. A chip remover comprising an adjustable supporting bracket having a guide way, a reciprocating chip striking hammer in said guideway, and an actuating spring carried by said bracket for driving said hammer on its striking stroke.

16. A chip remover comprising a support, a coiled spring carried thereby and having a radially projecting actuating end, and a chip-striking hammer actuated by said end on its striking stroke.

17. Metal cutters and a movable carrier for advancing said cutters through the work, in combination with a chip remover for said cutters, and means for actuating said remover in operating on said cutters to remove chips therefrom, said remover being actuated in the opposite direction by the movement of said carrier in advancing the cutters through the work.

18. Means for removing chips from the cutters of rotary metal saws comprising supporting means, means for driving the hammer on its chip dislodging stroke, and a chip dislodging hammer having a blow imparting and hammer retracting end.

19. Means for removing chips from the cutters of rotary metal saws comprising a supporting bracket, and a chip dislodging hammer carried by said bracket and yieldingly held with its striking and hammer-retracting end in chip engaging position.

20. In combination, a carriage, a rotary saw having cutters, a bracket secured to said carriage, and a spring impelled chip dislodging movable member carried by said bracket and arranged at a side face of the saw and having a chip engaging portion arranged to be successively retracted and released by said cutters to impart chip dislodging strokes.

21. In a metal cutting-off machine, or the like, in combination, a rotary blade having a central work receiving opening and cutters arranged around said opening, a supporting frame fixed with respect to said blade, a support secured to said frame, and chip removing means carried by said support and arranged beside said blade to act on said cutters successively for removing chips therefrom.

22. In combination, a metal cutting-off machine, a rotary blade carried thereby and having a central work receiving opening and cutters projecting thereinto, and chip removing means carried by said carriage and arranged beside said blade in operative chip removing relation with respect to said cutters to act thereon as they pass from the work.

In testimony whereof I affix my signature, in presence of two witnesses.

GEORGE GORTON.

Witnesses:
C. R. CARPENTER,
E. S. GERE.

Copies of this patent may be obtained for five cents each, by addressing the "Commissioner of Patents, Washington, D. C."